US005199337A

United States Patent [19]

Parker

[11] Patent Number: 5,199,337

[45] Date of Patent: Apr. 6, 1993

[54] TIRE CUTTER APPARATUS

[76] Inventor: Jack Parker, HC 73, Box 21, Karval, Colo. 80823

[21] Appl. No.: 755,948

[22] Filed: Sep. 6, 1991

[51] Int. Cl.[5] .......................... B23B 5/14; B26D 1/143

[52] U.S. Cl. .................................. 82/83; 51/DIG. 33; 82/101; 83/951; 157/13; 241/DIG. 31

[58] Field of Search ........................ 82/83, 57, 58, 101; 157/13; 83/951; 241/DIG. 31; 51/DIG. 33

[56] References Cited

U.S. PATENT DOCUMENTS

| | | | |
|---|---|---|---|
| 3,693,894 | 9/1972 | Willette | 241/279 |
| 3,701,296 | 10/1972 | Snow | 82/54 |
| 3,733,941 | 5/1973 | Geyer, Jr. | 82/101 X |
| 3,830,120 | 8/1974 | Peterson | 82/54 |
| 4,090,670 | 5/1978 | Bennett | 157/13 X |
| 4,134,316 | 1/1979 | Bullinger | 82/56 |
| 4,450,738 | 5/1984 | Tupper et al. | 82/82 |
| 5,054,351 | 10/1991 | Jolliffe et al. | 83/430 |

FOREIGN PATENT DOCUMENTS

| | | | |
|---|---|---|---|
| 306037 | 8/1971 | U.S.S.R. | 51/DIG. 33 |
| 1177161 | 9/1985 | U.S.S.R. | 241/DIG. 31 |
| 1391708 | 4/1988 | U.S.S.R. | 241/DIG. 31 |

*Primary Examiner*—Z. R. Bilinsky
*Attorney, Agent, or Firm*—Henderson & Sturm

[57] ABSTRACT

A tire splitting apparatus for splitting tire casings circumferentially into segments which includes a frame having a generally horizontal tire support table. Tire casing drive means are associated with the support table such that the drive means drivingly engages the outer crown of a tire casing and rotates the tire casing on the support table. Also included are at least two opposing guides for engaging the outer crown of a tire casing such that a tire casing situated on the support table rotates substantially over the center of the support table. A tire casing situated and rotated on the support table may be cut circumferentially with slicing means mounted on the support table generally opposite the drive means. Finally, adjustment means are provided for selectively engaging tire casings of varying diameters.

6 Claims, 9 Drawing Sheets

42

TIRE CUTTER APPARATUS

TECHNICAL FIELD

This invention relates to cutting devices and more particularly to tire casing cutters capable of slicing tires.

BACKGROUND ART

About 234 million tires are discarded annually. Very few of these tires are recycled and most (over 82%) are either illegally dumped or end up in land fills.

In the mining industry large dump trucks are commonly used. Some of these trucks require off road tires which are three feet wide and 10 feet in diameter. Such tires weigh in excess of 3000. Because of their large size, such tires pose special disposal problems.

Several prior art devices have been disclosed which have been designed to slice tire casings circumferentially. For example, Peterson, U.S. Pat. No. 3,830,120, discloses a tire cutting apparatus which utilizes a mandrel to push against the interior sidewalls of a tire casing. The Peterson mandrel forces the outer crown of a tire casing against a rotating knife. While the Peterson apparatus is capable of cutting small tires its design is impractical for handling large tire casings.

Tupper, et al., U.S. Pat. No. 4,450,738, discloses a tire splitting apparatus that also utilizes a mandrel. While the Tupper, et al. apparatus is capable of slicing somewhat larger tire casings it is difficult to load and incapable of slicing tires with large widths and diameters.

Snow, U.S. Pat. No. 3,701,296, discloses an apparatus for cutting strips from vehicle tires. The Snow apparatus also utilizes a mandrel. While the Snow apparatus is simple in use and operation, its mandrel design makes it effective for slicing only small automotive tires casings.

Finally, Bullinger, U.S. Pat. No. 4,134,316, discloses an apparatus for cutting tire carcasses into individual annular elements. The Bullinger apparatus also utilizes an interior mandrel and is adapted only for cutting small tires.

Those concerned with these and other problems recognize the need for an improved tire splitting apparatus capable of slicing large tire casings circumferentially.

DISCLOSURE OF THE INVENTION

The present invention provides a tire splitting apparatus for splitting tire casings circumferentially into segments. These segments may then be recycled for use as livestock feeders or water tanks or as fencing materials. The apparatus includes a frame having a generally horizontal tire support table. Also provided are tire casing drive means associated with the support table such that the drive means drivingly engages the outer crown of a tire casing and rotates the tire casing on the support table.

At least two opposing guides are also included for engaging the outer crown of a tire casing such that a tire casing situated on the support table rotates substantially over the center of the support table. A tire casing situated and rotated on the support table may be cut circumferentially with slicing means mounted on the support table generally opposite the drive means. Finally, adjustment means are provided for selectively engaging tire casings of varying diameters.

A primary object of the present invention is to provide an improved tire splitting apparatus capable of slicing large tire casings circumferentially.

Another object is to provide an improved tire splitting apparatus which does not utilize an interior mandrel.

A further object of the invention is to provide an improved tire splitting apparatus which is efficient in use and durable in construction.

Still another object is to provide an improved tire splitting apparatus which is safe and energy efficient in operation.

A still further object of the present invention is to provide a tire splitting apparatus which is easy to load and unload. A still further object of the present invention is to provide a tire splitting apparatus which enables the recycling of tire casings for use as livestock feeders or water tanks or as fencing materials.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
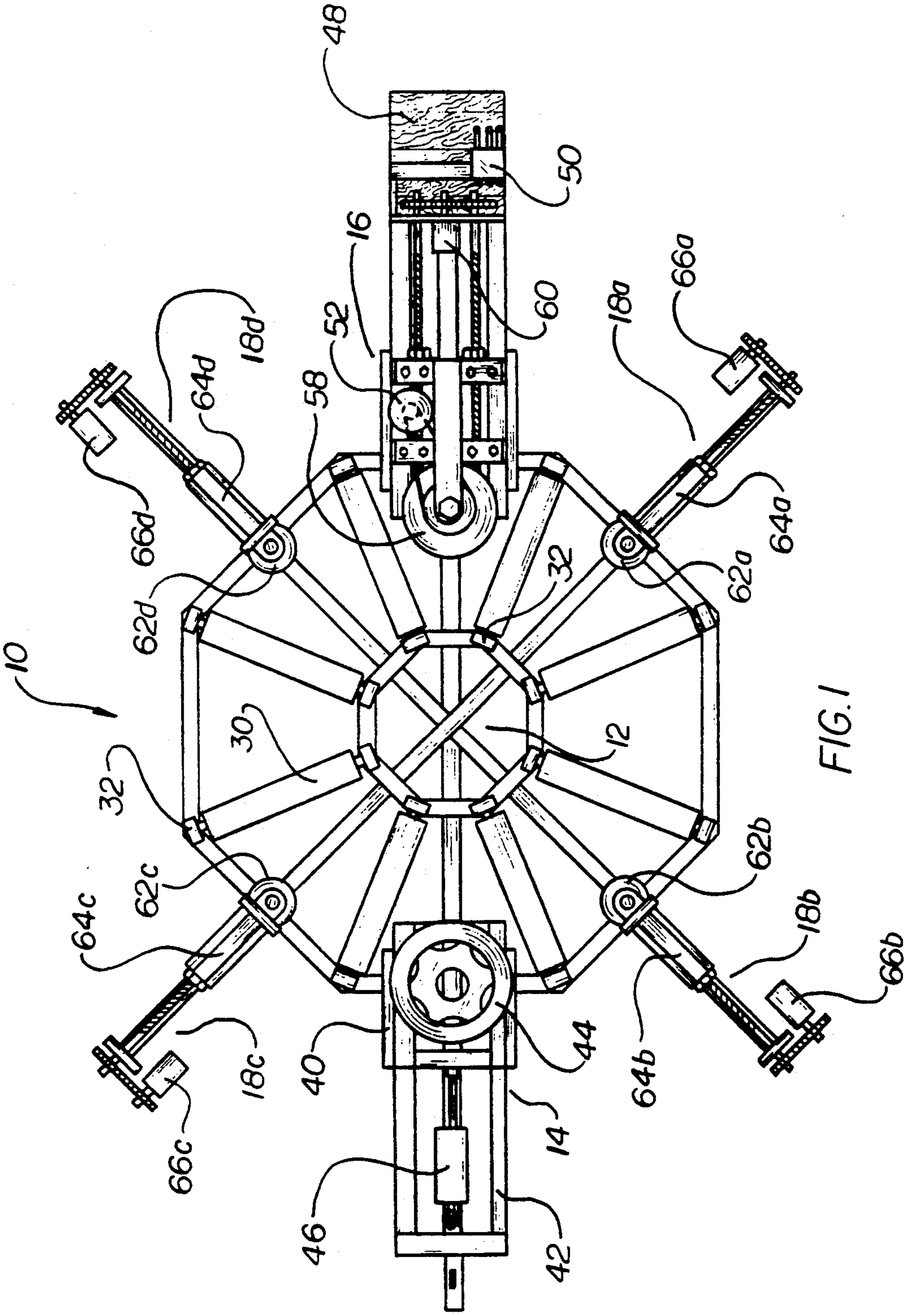
FIG. 1 is a top plan view of the tire splitting apparatus illustrating the various assemblies and components of the present invention.

Referring now to the drawings, wherein like reference numerals designate identical or corresponding parts throughout the several views. FIG. 1 shows the cutting table assembly 12, drive assembly 14, outer crown cutter assembly 16, and guide assemblies (18_a_, 18_b_, 18_c_, & 18_d_).

Figure 3:
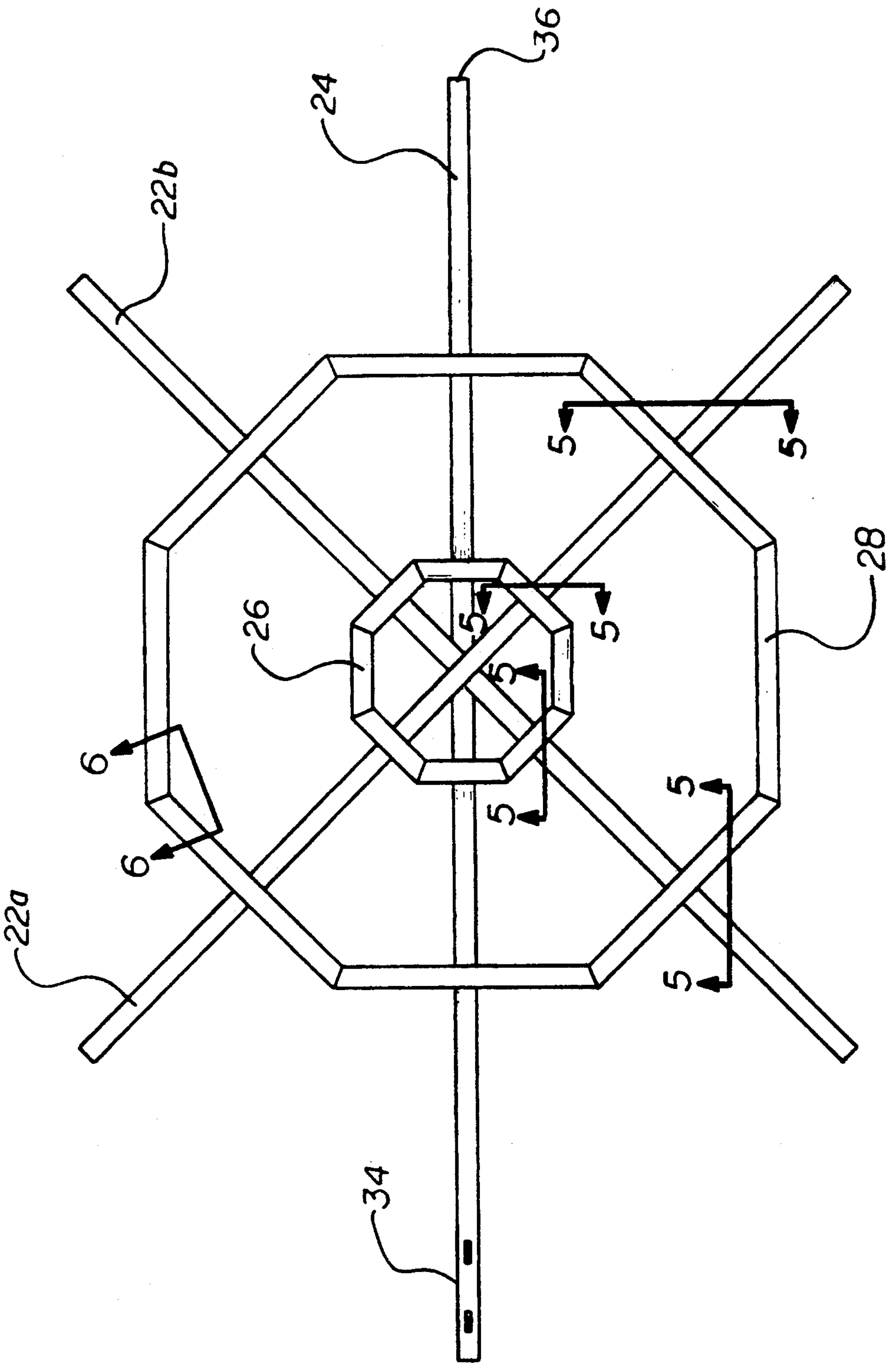
FIG. 3 is a top plan view of the cutting table assembly of the present invention.
Figure 6:
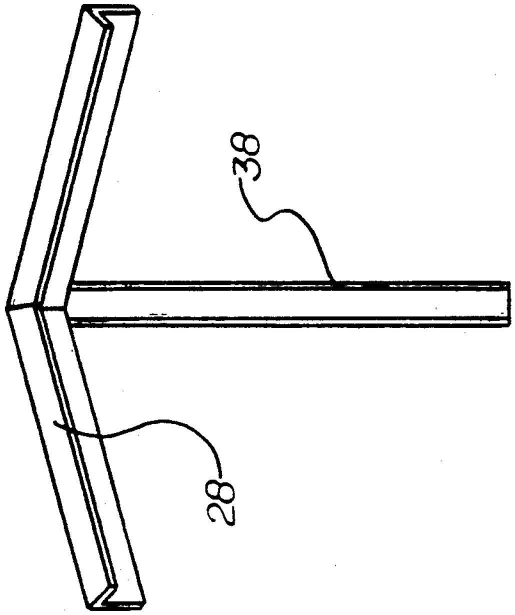
FIG. 6 is a perspective view of an angle iron to angle iron joint variously found in the construction of the cutting table assembly of the present invention.
Figure 5:
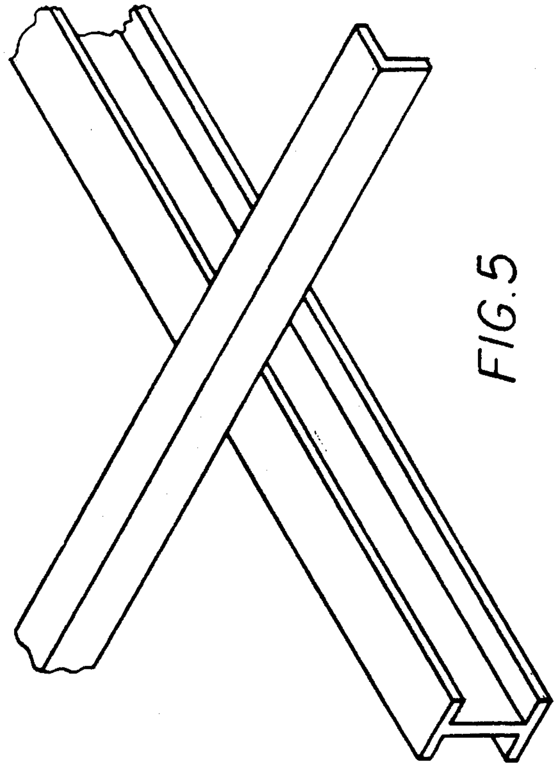
FIG. 5 is a perspective view of an I-beam to angle iron joint variously found in the construction of the cutting table assembly of the present invention.

FIGS. 3, 4, 5, and 6 illustrate the components of the cutting table assembly 12. In a preferred embodiment the apparatus 10 is dimensioned such that it may accommodate tire casings having 10 foot diameters. As shown best in FIG. 3, the cutting table is fabricated from 4 inch I-beams and 2 inch angle irons. The cutting table assembly 12 includes a sub-frame constructed of a guide assembly support member 20 fabricated from two beams (22_a_, 22_b_) disposed at 90° angles. The guide assembly support member 20 is disposed at 45° angles over a drive and cutter assembly central support beam 24 (FIG. 3).

Figure 4:
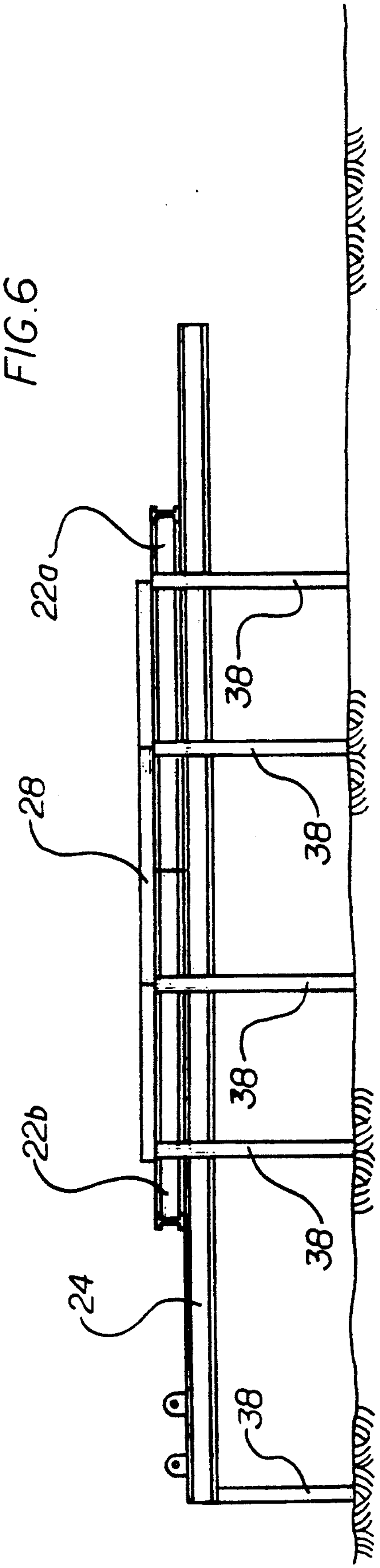
FIG. 4 is a side elevation view of the cutting table assembly of the present invention.

A central octagon roller support 26 and a larger outer octagon roller support 28 are disposed over the cutting table assembly 12 sub-frame such that the sides of each of the octagons (26 & 28) are parallel (FIG. 3). Rotatably attached between the corners of the octagons (26 & 28) are eight tire carrier rollers 30 (FIG. 1). These rollers 30 are preferably mounted between bearings 32. As best illustrated by FIG. 4 the resulting components are raised from a support surface by a plurality of legs 38.

Slidably mounted on a first end 34 of the central support beam 24 is a drive assembly 14. Slidably mounted on a second end 36 of the central support beam 24 is a cutter assembly 16. Likewise, slidably mounted on each end of the cross beams (22_a_ & 22_b_) is a guide assembly (FIG. 1).

Figure 12:
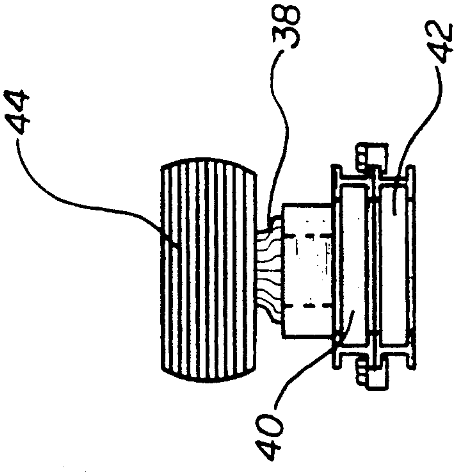
FIG. 12 is a front elevational view of the drive assembly of the present invention illustrating the various components of the drive assembly.
Figure 11:
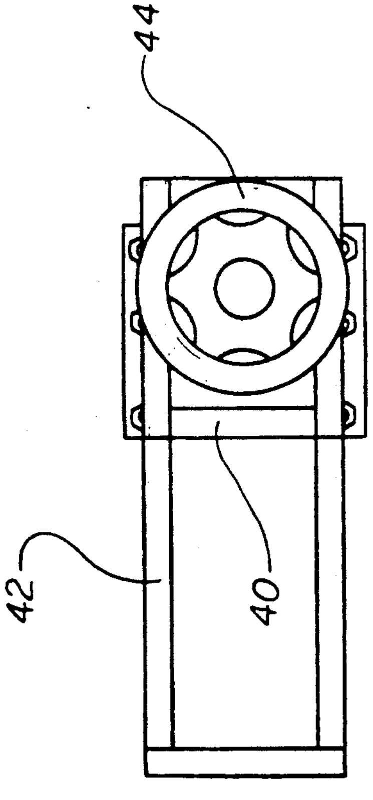
FIG. 11 is a top plan view of the drive assembly of the present invention illustrating the various components of the drive assembly.
Figure 10:
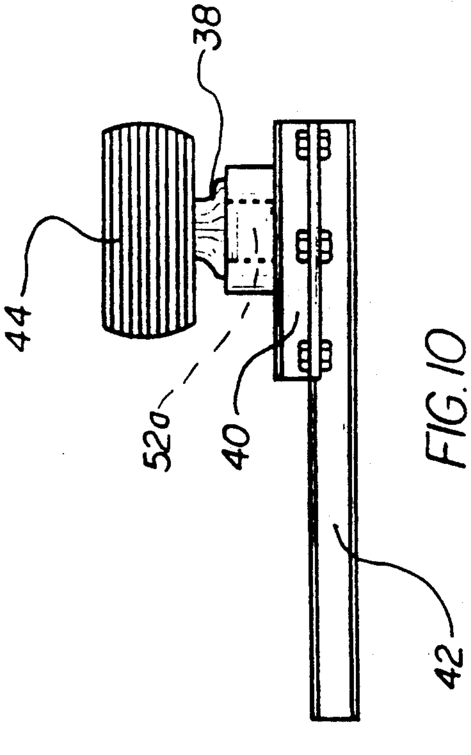
FIG. 10 is a side elevational view of the drive assembly of the present invention illustrating the various components of the drive assembly.

FIGS. 10, 11, and 12 illustrate the components of the drive assembly 14. The assembly 14 includes a hydraulic motor 38 mounted on a motor frame 40 which is adjustably mounted on a support frame 42. A drive wheel 44 is rotatably driven by the shaft of the motor 38. The drive assembly 14 may be moved, so as to accommodate tire casings of various diameters, with a hydraulic cylinder 46 (FIG. 1).

Figure 8:
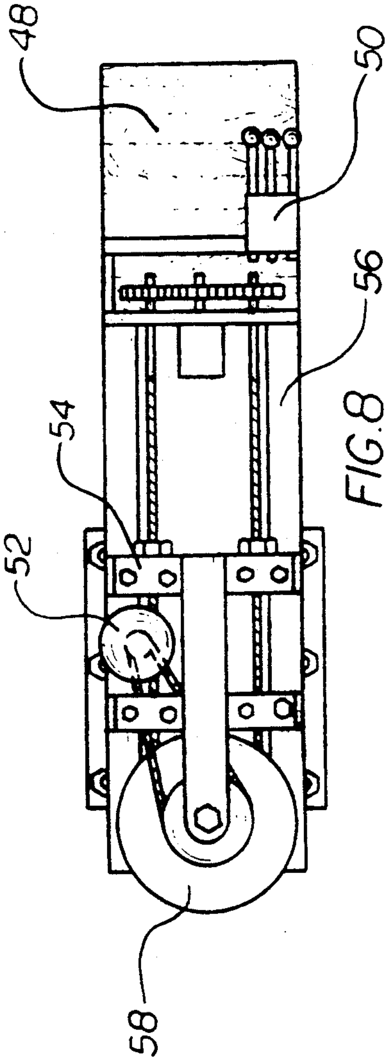
FIG. 8 is a top plan view of the cutter assembly of the present invention illustrating the blade drive components.
Figure 7:
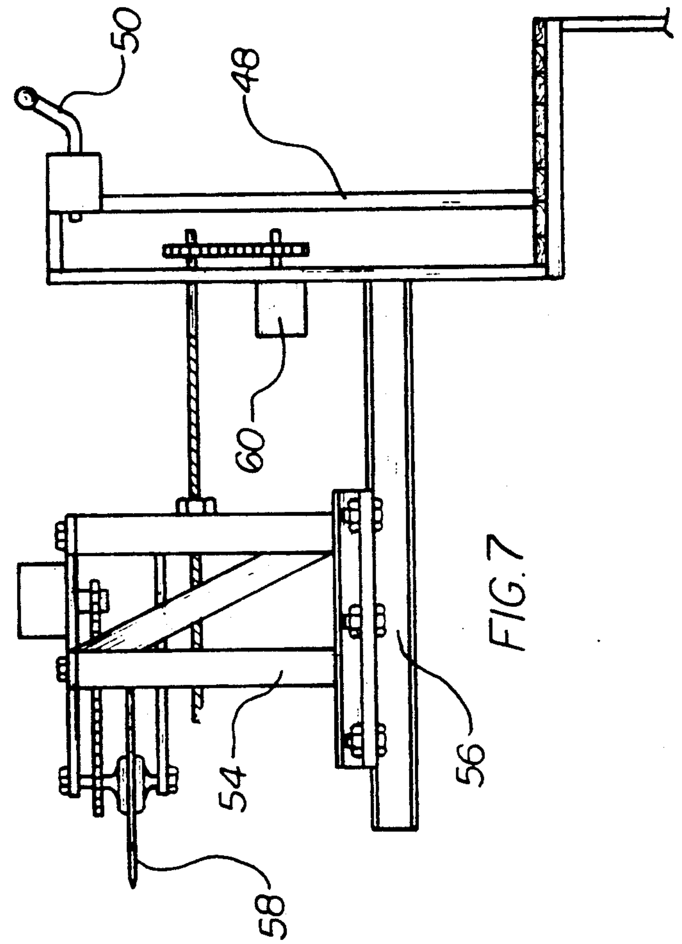
FIG. 7 is a side elevational view of the cutter assembly of the present invention illustrating the operator station and control panel.
Figure 9:
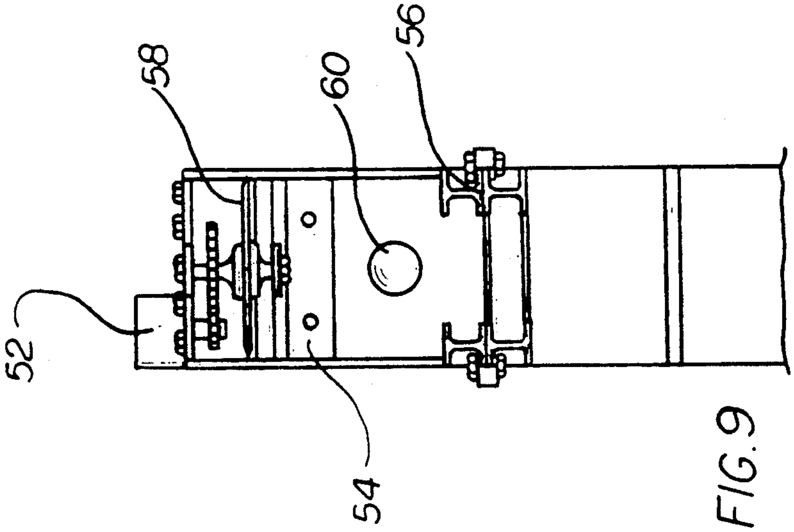
FIG. 9 is a front elevational view of the cutter assembly of the present invention illustrating the various cutter assembly components.

FIGS. 7, 8, and 9 illustrate the components of the outer crown cutter assembly 16. The cutter assembly 16 includes an operator station 48 whereby an operator may manipulate the controls 50 of the apparatus 10. A hydraulic motor 52 is mounted to a motor frame 54 which is adjustably mounted to support frame 56. The support frame 56 is mounted on the second end 36 of the central support beam 24.

A circular cutting blade 58 is rotatably driven by the motor 52. The cutter assembly 16 may be moved, so as to accommodate tire casings of various diameters, with a hydraulic motor 60 (FIGS. 7 & 8). In a preferred embodiment the cutting blade 58 is rotated at a greater rate than the drive wheel 44 in order to facilitate cutting action.

Figure 15:
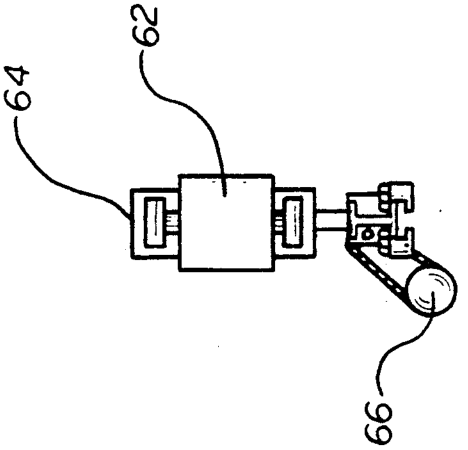
FIG. 15 is a front elevational view of a guide assembly of the present invention illustrating the various components of each of the guide assemblies.
Figure 14:
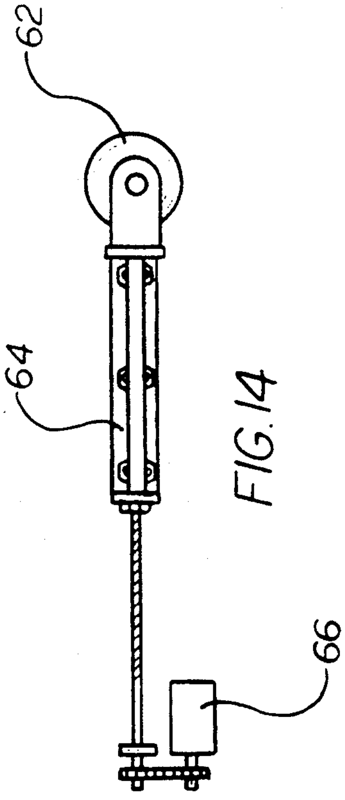
FIG. 14 is a top plan view of a guide assembly of the present invention illustrating the various components of each of the guide assemblies.
Figure 13:
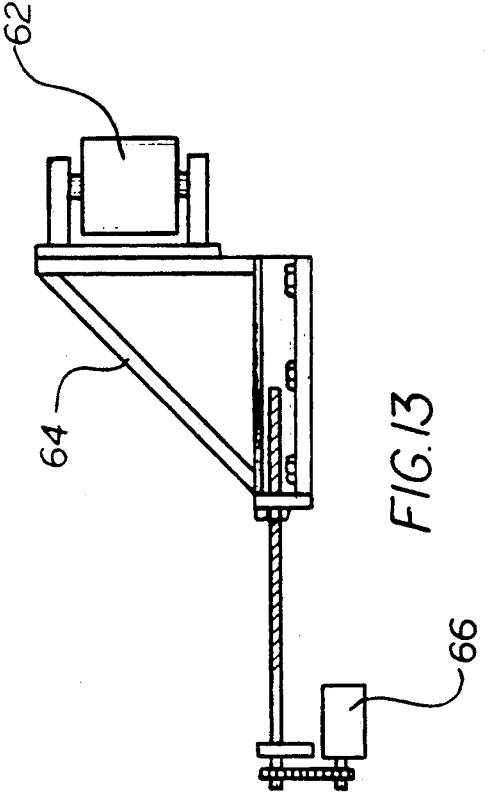
FIG. 13 is a side elevational view of a guide assembly of the present invention illustrating the various components of each of the guide assemblies.

FIGS. 13, 14, and 15 illustrate the components of the guide assemblies (18_a_, 18_b_, 18_c_, & 18_d_). Each of these assemblies includes a roller 62 attached to a frame 64 which is slidably driven by a hydraulic motor 66. In this fashion, each of the assemblies may be slidably driven along the length of their respective cross beams such that tire casings of various diameters may be accommodated by the apparatus 10.

Figure 16:
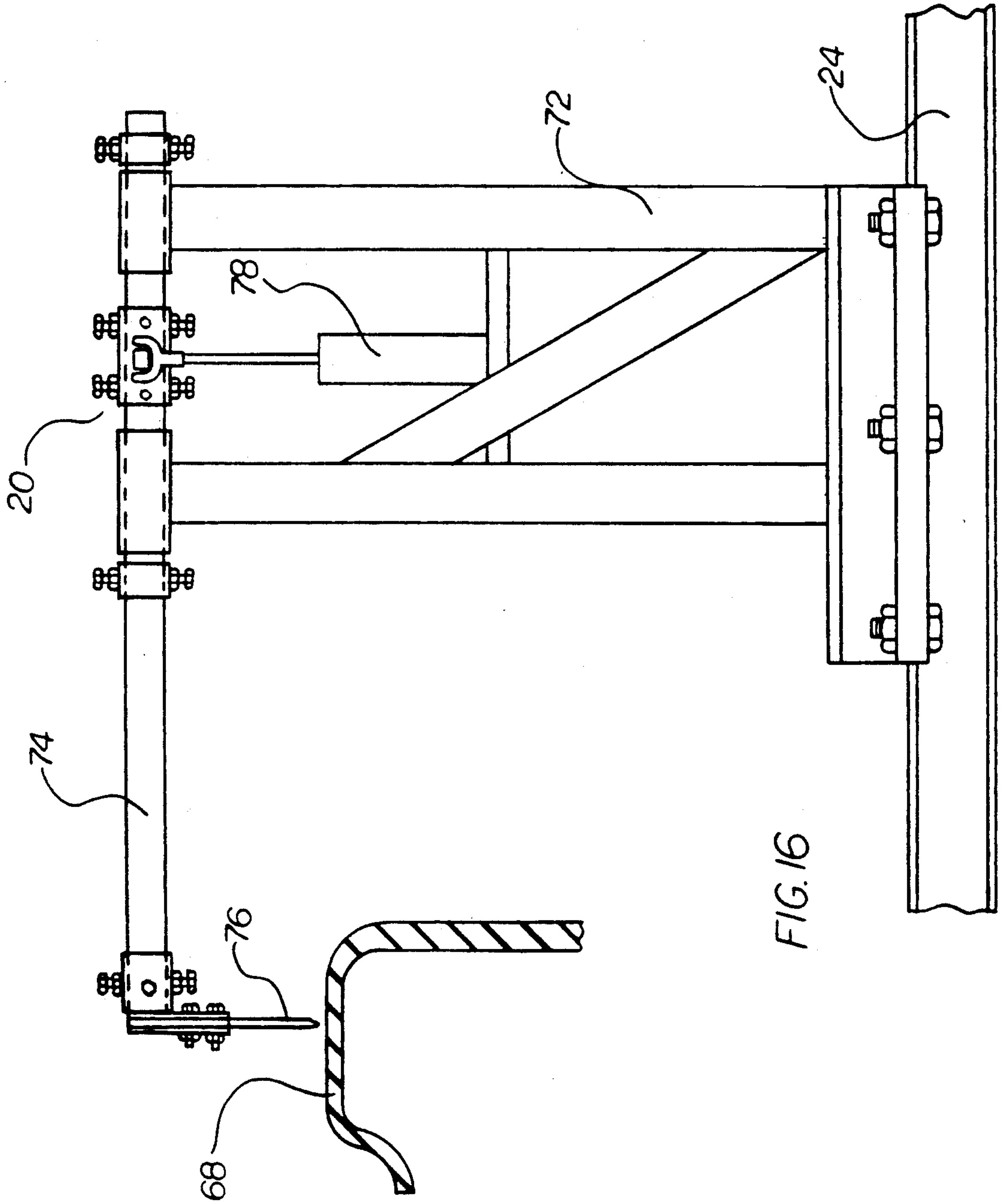
FIG. 16 is a side elevational view of a sidewall cutter assembly of the present invention illustrating the various components of the sidewall cutter assembly.

FIG. 16 illustrates the components of a sidewall cutter assembly 20. The sidewall cutter assembly 20 may be mounted on the second end 36 of the central support beam 24 such that the sidewall 68 of a tire casing may be removed from the crown 70. The assembly 20 includes a frame 72, an adjustable blade beam 74, a blade 76, and a hydraulic cylinder 78 for engaging or disengaging the blade 76 from the sidewall 68 of a tire casing.

Figure 2:
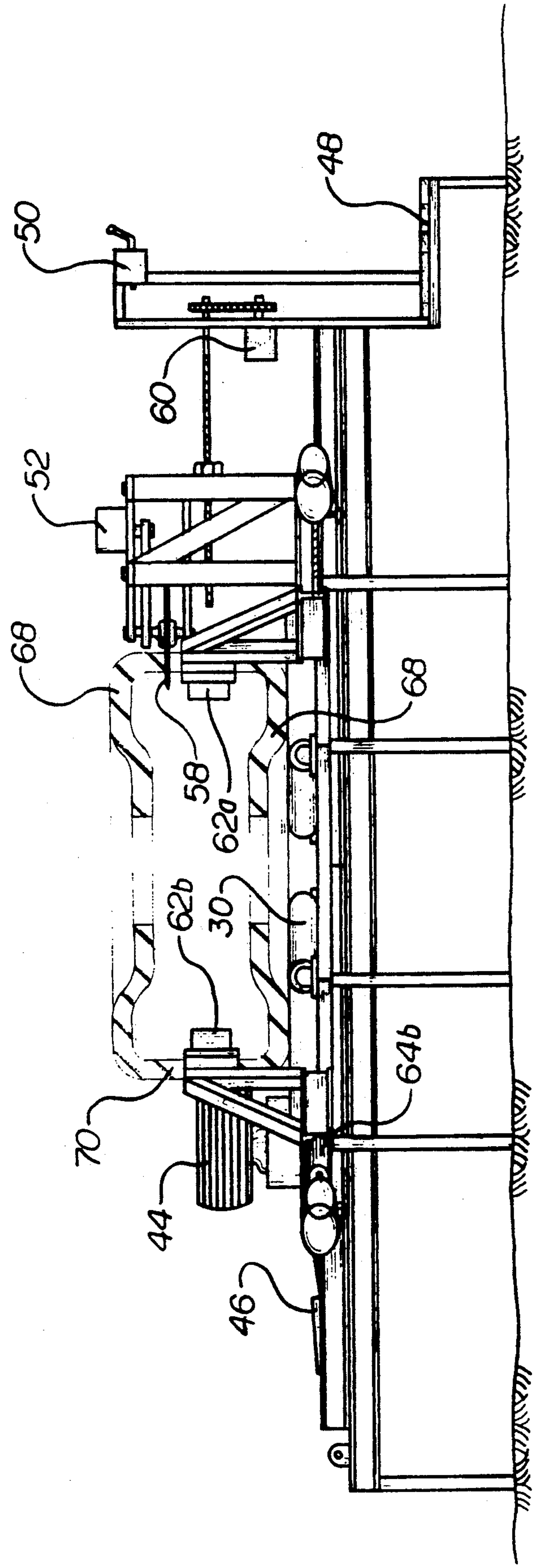
FIG. 2 is a side elevational cross-sectional view of the tire splitting apparatus illustrating the present invention in use.
Figure 17:
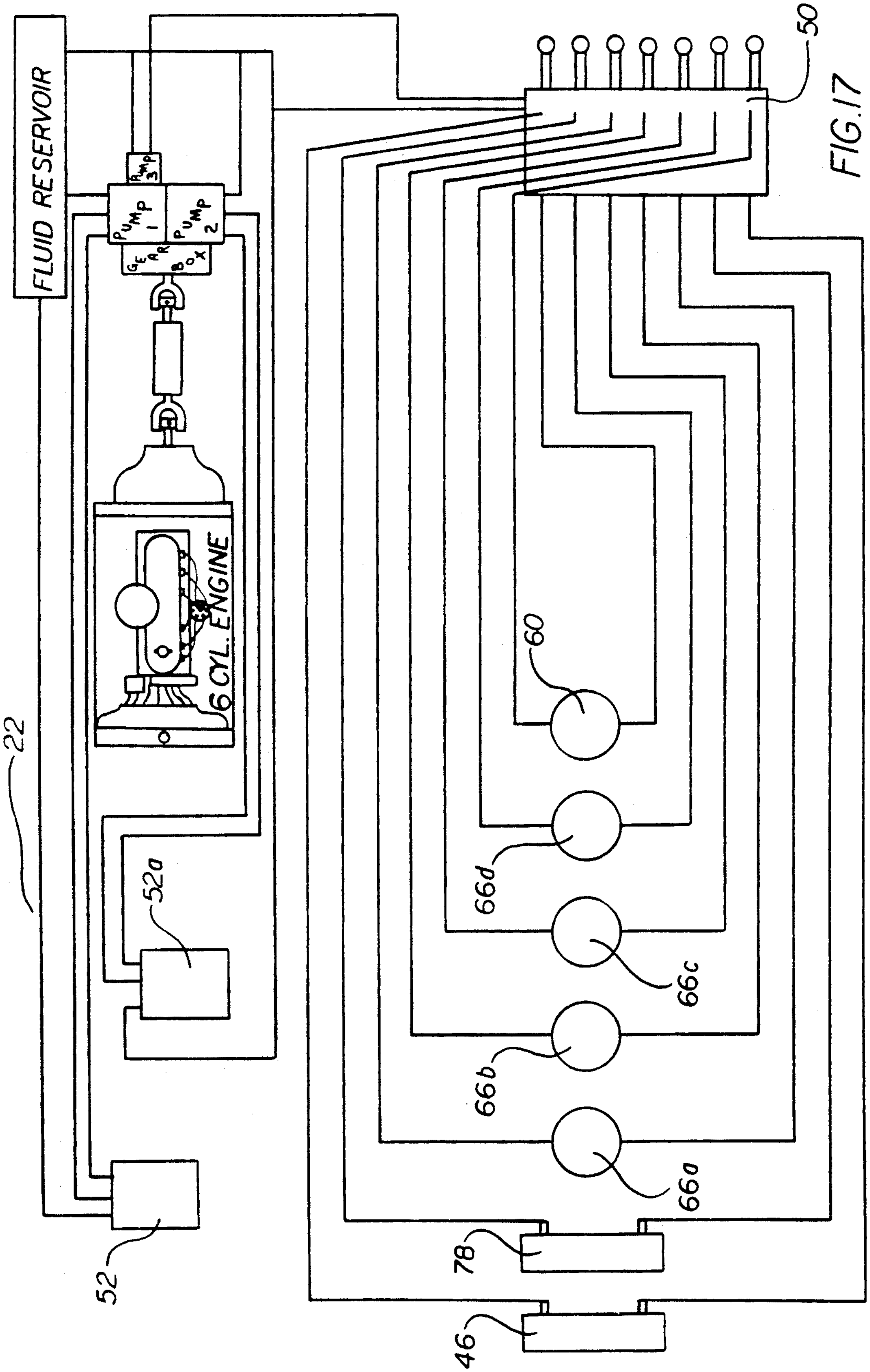
FIG. 17 is a diagrammatic view of the various hydraulic system components of the present invention.

FIG. 2 illustrates the apparatus 10 in use. FIG. 17 diagrammatically illustrates the hydraulic system 22 of the apparatus 10.

Thus, it can be seen that at least all of the stated objectives have been achieved. Obviously, many modifications and variations of the present invention are possible in light of the above teachings. It is therefore to be understood that, within the scope of the appended claims, the invention may be practiced otherwise than as specifically described.

I claim:

1. A tire splitting apparatus for splitting tire casings circumferentially into segments, comprising:

a frame having a generally horizontal tire support table;

drive means mounted on said support table for engaging the outer crown of a tire casing and rotating a tire casing on said support table;

at least one pair of diametrically opposing support guides for engaging the outer crown of a tire casing such that a tire casing situated on said support table rotates substantially over the center of said support table;

cutting means diametrically opposite said drive means for slicing a tire casing circumferentially into segments;

adjustment means operatively connected to said support guides whereby tire casings of varying diameter may be sliced into circumferential segments and recycled;

wherein said drive means and said support guides and said cutting means are external to the tire to be split.

2. The tire splitting apparatus of claim 1, further comprising cutter means for removing a sidewall from a tire casing.

3. The tire splitting apparatus of claim 1, wherein said drive means comprises:

a drive wheel rotatably mounted on said frame such that the outer crown of said drive wheel rotatably engages the outer crown of a tire casing situated on said tire support table; and means for drivingly rotating said drive wheel.

4. The tire splitting apparatus of claim 3, wherein said means for drivingly rotating said drive wheel is a hydraulic motor.

5. The tire splitting apparatus of claim 1, wherein said cutting means comprises:

a circular cutting blade rotatably mounted on said frame such that the cutting surface rotatably cuts into the outer crown of a tire casing situated on said tire support table; and means for drivingly rotating said circular cutting blade.

6. The tire splitting apparatus of claim 5, wherein said means for drivingly rotating said circular cutting blade is a hydraulic motor.

* * * * *